(12) United States Patent
Harada et al.

(10) Patent No.: US 8,485,574 B2
(45) Date of Patent: Jul. 16, 2013

(54) VEHICLE BUMPER STRUCTURE

(75) Inventors: Junya Harada, Wako (JP); Akihiro Shibuya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/529,020

(22) Filed: Jun. 21, 2012

(65) Prior Publication Data
US 2013/0009411 A1    Jan. 10, 2013

(30) Foreign Application Priority Data
Jul. 5, 2011    (JP) .................................. 2011-149026

(51) Int. Cl.
*B60R 19/04*    (2006.01)
(52) U.S. Cl.
USPC ..................................... 293/120; 296/187.09
(58) Field of Classification Search
USPC ................ 296/187.02, 187.09; 293/109, 120, 293/121, 142, 144
See application file for complete search history.

(56) References Cited

U.S. PATENT DOCUMENTS

| | | | | |
|---|---|---|---|---|
| 6,669,251 B2 * | 12/2003 | Trappe | ........................... | 293/120 |
| 7,686,358 B2 * | 3/2010 | Takahashi et al. | ............ | 293/102 |
| 8,196,979 B2 * | 6/2012 | Ralston et al. | ................ | 293/121 |
| 2002/0149214 A1 * | 10/2002 | Evans | ........................ | 293/120 |
| 2003/0189343 A1 * | 10/2003 | Evans et al. | ................... | 293/120 |
| 2008/0185851 A1 * | 8/2008 | Evans et al. | ................... | 293/120 |
| 2012/0032458 A1 * | 2/2012 | Brooks et al. | ................. | 293/120 |

FOREIGN PATENT DOCUMENTS
JP    2006-036079 A    2/2006

* cited by examiner

*Primary Examiner* — Jason S Morrow
(74) *Attorney, Agent, or Firm* — Westerman, Hattori, Daniels & Adrian, LLP (57) ABSTRACT

A vehicle bumper structure includes a bumper beam and an absorber. The bumper beam includes an upper absorber support surface and an upper reinforcing rib. The upper reinforcing rib includes an upper rib body portion and a pair of right and left upper rib bend portions extending from right and left ends of the upper rib body portion so as to bend toward a vehicle inner side. The absorber includes an absorber body, a pair of right and left upper absorber support legs extending from the absorber body across the upper reinforcing rib, and a pair of right and left contact portions extending outward in a vehicle width direction from the upper absorber support legs so as to be in contact with the right and left upper rib bend portions from the vehicle inner side.

7 Claims, 6 Drawing Sheets

VEHICLE BUMPER STRUCTURE

CROSS REFERENCES TO RELATED APPLICATIONS

The present application claims priority under 35 U.S.C. §119 to Japanese Patent Application No. 2011-149026, filed Jul. 5, 2011, entitled "Vehicle Bumper Structure." The contents of this application are incorporated herein by reference in their entirety.

TECHNICAL FIELD

The present application relates to a vehicle bumper structure including a bumper beam and an absorber.

BACKGROUND

In typical vehicle bumper structures, an absorber serving as an absorbing device for mitigating the impact is frequently provided between a bumper beam and a bumper face. For example, in a vehicle bumper structure disclosed in Japanese Unexamined Patent Application Publication No. 2006-36079 (paragraph [0023], FIG. 5), support ends extend from right and left sides of an absorber body, and right and left engaging pins project from the support ends toward a vehicle inner side. The right and left engaging pins are inserted in insertion holes provided in side surfaces of a bumper beam to position an absorber in the right-left direction.

However, there is a need to form the insertion holes for positioning in the bumper beam in the structure of the related art, a step of forming the insertion holes is added, and this increases the production cost of the bumper beam.

Although sufficient performance can originally be ensured only by mounting the absorber at the center of the bumper beam, since the support ends extend from the right and left sides of the absorber body so that the engaging pins for positioning are formed on the support ends, the weight and cost of the absorber are increased. Moreover, since the right and left support ends occupy the space between the bumper face and the bumper beam, the degree of flexibility in layout is decreased.

SUMMARY

The present application describes a vehicle bumper structure that allows an absorber to be positioned with a simple structure.

The present application provides a vehicle bumper structure including a bumper beam laid in a vehicle width direction between ends of right and left frame members extending in a vehicle front-rear direction, and an absorber provided along a bumper load input surface of the bumper beam that receives an impact load. The bumper beam includes an absorber support surface extending toward a vehicle inner side from at least one of upper and lower ends of the bumper load input surface, and a reinforcing rib projecting from the absorber support surface. The reinforcing rib includes a rib body, and a pair of right and left rib bend portions extending from right and left ends of the rib body so as to bend toward the vehicle inner side. The absorber includes an absorber body that receives the impact load, a pair of right and left absorber support legs extending from the absorber body over the reinforcing rib, and a pair of right and left contact portions extending outward in the vehicle width direction from the absorber support legs so as to contact to the right and left rib bend portions from the vehicle inner side. Here, "bend portion(s)" includes a curve shaped portion or an angular shaped portion, or both.

According to this structure, since the bumper beam is provided with the absorber, the absorber absorbs the impact load, and avoids concentration of the impact load at the bumper beam. Thus, the impact load can be absorbed while being dispersed to uniformly deform the bumper beam.

Further, the pair of right and left contact portions extend outward in the vehicle width direction from the right and left absorber support legs to contact to the right and left rib bend portions from the vehicle inner side. Hence, the absorber is restricted in rightward and leftward movement owing to vibration caused in mounting of the absorber and in low-speed operation of the engine during vehicle running. For this reason, it is unnecessary to form engaging pins and insertion holes for positioning of the absorber, and this achieves a simple structure.

Moreover, since the absorber is drawn to the bumper beam by the contact portions, it is restricted in frontward and rearward movement owing to vibration caused in the low speed operation of the engine during vehicle running. This prevents noise and vibration from being caused when the absorber swings frontward and rearward into and contacts with the bumper beam.

Preferably, the absorber support surface extends toward the vehicle inner side from at least the upper end of the bumper load input surface, and the contact portions contact with the absorber support surface from an upper side.

According to this structure, since the contact portions contact not only with the rib bend portions but also with the absorber support surface, the absorber is restricted in downward movement. For this reason, the absorber can be easily mounted and positioned in the up-down direction, and can be prevented from hanging under its own weight.

Preferably, the absorber support surface includes an upper absorber support surface extending toward the vehicle inner side from the upper end of the bumper load input surface, and a lower absorber support surface extending toward the vehicle inner side from the lower end of the bumper load input surface. The absorber support legs include an upper absorber support leg provided on an upper side of the absorber body, and a lower absorber support leg provided on a lower side of the absorber body. The absorber support legs each include a plurality of leg portions extending from the absorber body across the reinforcing rib toward the vehicle inner side, and a base portion that connects the leg portions in the vehicle width direction. The base portion includes an engaging claw provided near the center in the vehicle width direction. The engaging claw of the upper absorber support leg extends toward the upper absorber support surface and engages with the reinforcing rib of the upper absorber support surface, and the engaging claw of the lower absorber support leg extends toward the lower absorber support surface and engages with the reinforcing rib of the lower absorber support surface.

According to this structure, the engaging claw of each of the absorber support legs provided on the upper and lower sides of the absorber is engaged with the reinforcing rib projecting from each of the absorber support surfaces provided on the upper and lower sides of the bumper beam. Hence, the absorber can be easily fixed to the bumper beam without using a separate member during mounting, and can be positioned in the front-rear, right-left, and up-down directions. This facilitates positioning operation.

Since both ends in the vehicle width direction of the base portion having the engaging claw at the center are supported by the leg portions, support rigidity of the engaging claw is increased. For this reason, the engaging claw can be firmly supported against the load acting thereon owing to vibration caused in mounting and low speed operation of the engine during vehicle running.

Preferably, the bumper beam includes a bumper body, and bumper bend portions extending from right and left ends of the bumper body to bend toward the vehicle inner side, and the absorber is located on a part of the bumper load input surface in the bumper body.

According to this structure, the bumper beam includes the bumper bend portions on the right and left sides thereof, and the absorber is provided on the part of the bumper load input surface in the bumper body. Hence, the contact portions of the absorber contact with the rib bend portions provided in the bumper bend portions, so that the absorber is restricted in rightward and leftward movement. For this reason, unlike the structure of the related art, there is no need to perform boss forming by extending support ends on the right and left sides of the absorber for positioning, and the length of the absorber itself can be shortened while maintaining the impact absorbing performance. This achieves weight and cost reduction.

Preferably, the absorber load input surface in the absorber body that receives the impact load is shaped, in plan view, like an arc whose center in the vehicle width direction protrudes in a load input direction, and parts of the bumper load input surface in the bumper bend portions are provided on extension lines obtained by extending the arc shape of the part of the absorber load input surface to the right and the left.

According to this structure, the part of the absorber load input surface in the absorber body that receives the impact load is shaped, in plan view, like the arc whose center in the vehicle width direction protrudes in the load input direction. Hence, the impact load in the vehicle front-rear direction is properly absorbed, and the bumper beam can be uniformly deformed while avoiding concentration of the impact load at the bumper beam and dispersing the impact load.

Further, since the parts of the bumper load input surface in the bumper bend portions are provided on the extension lines obtained by extending the arc shape of the absorber load input surface to the right and the left, the absorber load input surface and the bumper load input surface are flush with each other, and the degree of flexibility in design is increased without any influence on the shape of the bumper face.

Preferably, the absorber body is substantially M-shaped in a cross section perpendicular to the vehicle width direction.

According to this structure, the absorber body substantially M-shaped in cross section can properly absorb the impact load in the vehicle front-rear direction. Moreover, the bumper beam can be uniformly deformed by dispersing the impact load to avoid concentration of the impact load at the bumper beam.

BRIEF DESCRIPTION OF THE DRAWINGS

The advantages of the disclosure will become apparent in the following description taken in conjunction with the drawings, in which.

DETAILED DESCRIPTION

A vehicle bumper structure according to an embodiment will be described in detail with reference to FIGS. 1 to 5A, and 6A and 6B. In the embodiment, the vehicle bumper structure is applied to a front bumper of a car C serving as a vehicle. In the description, like components are denoted by like reference numerals, and redundant descriptions are omitted. Further, frontward, rearward, rightward, leftward, upward, and downward directions are based on directions viewed from the driver of the vehicle.

Figure 1:
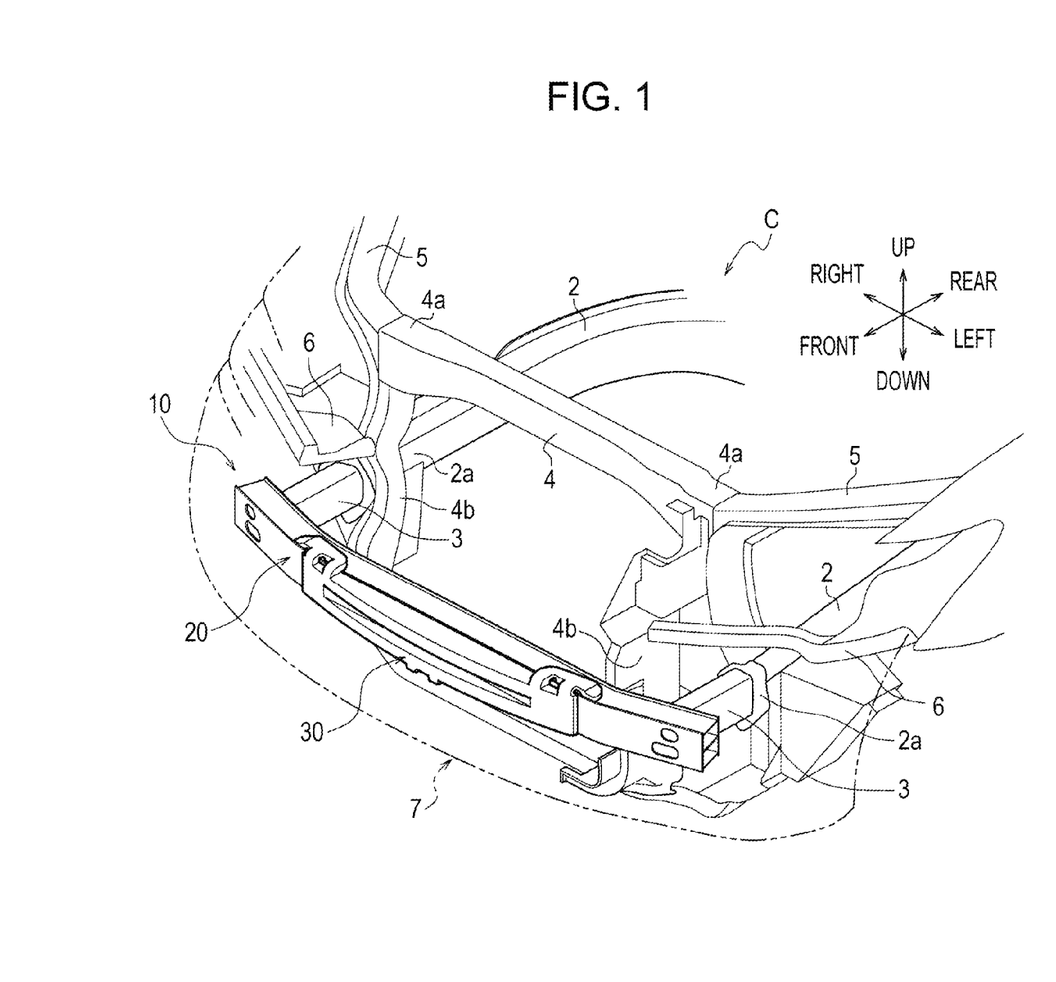
FIG. 1 is a perspective view of a vehicle front including a vehicle bumper structure according to an embodiment.

As illustrated in FIG. 1, a vehicle bumper structure 10 of the embodiment includes a bumper beam 20 attached to ends of right and left front side frames 2 (frame members) extending in a front-rear direction, and an absorber 30 provided in the front of the bumper beam 20. The vehicle bumper structure 10 is covered with a bumper face 7 shown by an imaginary line (two-dot chain line) in FIG. 1. A front surface of the absorber 30 and a rear surface of the bumper face 7 are arranged with some clearance therebetween, but are not in contact with each other.

Cylindrical extensions 3 serving as cushioning members are provided between front ends 2a of the front side frames 2 and the bumper beam 20. A bulk head 4 shaped like a rectangle in front view is also attached to the front ends 2a of the front side frames 2. Both upper corners 4a of the bulk head 4 are supported by side members 5. Upper beam brackets 6 are attached at one end to the centers of right and left frames 4b of the bulk head 4.

Figures 2A, 2B:
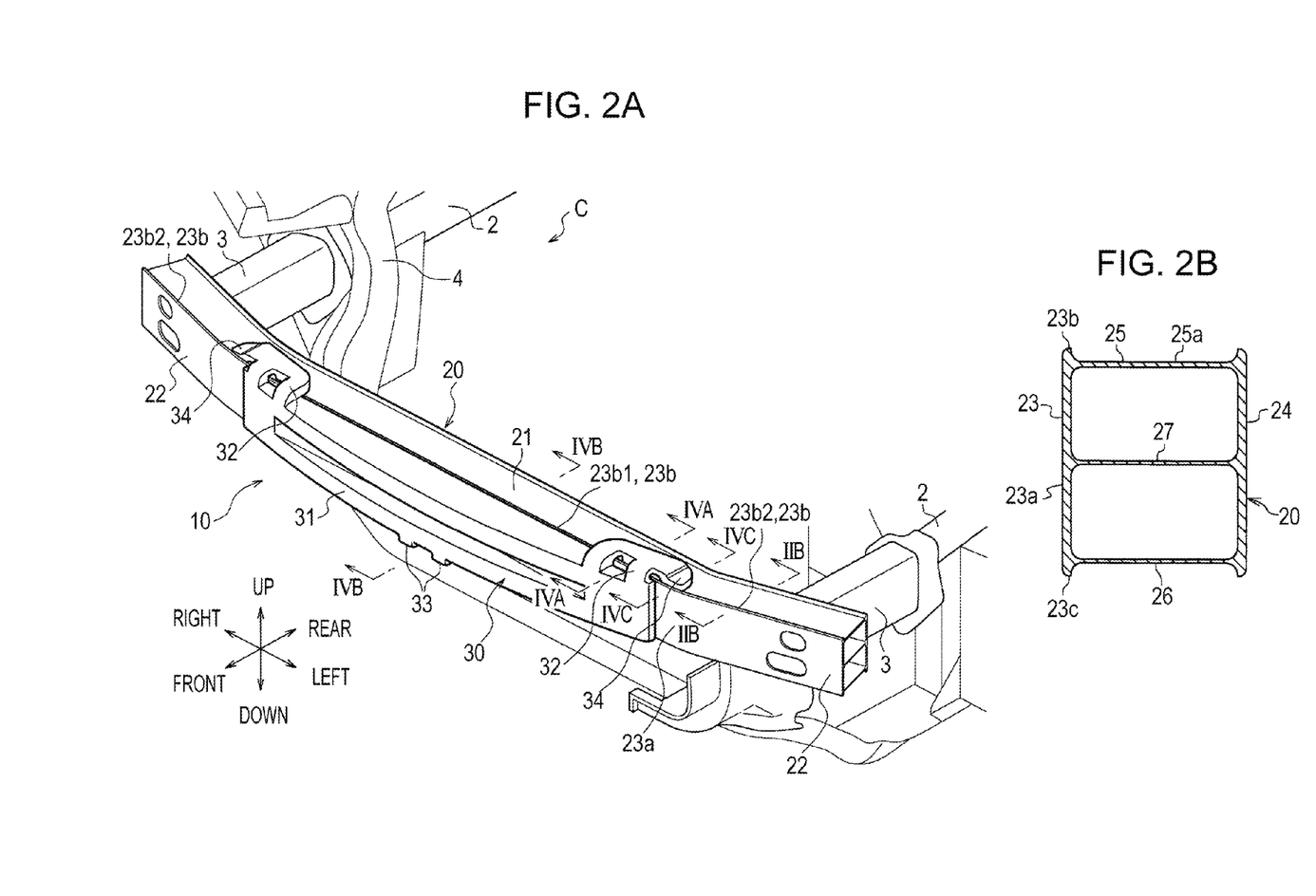
FIG. 2A is an enlarged perspective view of the vehicle bumper structure of the embodiment.
FIG. 2B is a cross-sectional view of a bumper beam, taken along line IIB-IIB in FIG. 2A.

As illustrated in FIG. 2A, the bumper beam 20 is a member shaped like a rectangular cylinder and extending in a vehicle width direction at the front of the car C. For example, the bumper beam 20 is formed of an extruded aluminum alloy. The bumper beam 20 includes a bumper body 21 extending straight in a right-left direction, and a pair of right and left bumper curve portions 22 extending outward from right and left sides of the bumper body 21 to be curved toward a vehicle inner side. In other words, the right and left bumper curve portions 22 are curved (inclined) to be located closer to the vehicle inner side (rear side) in the front-rear direction as they extend toward the vehicle outer side in the right-left direction. The bumper body 21 is not limited to the straight shape, and may include a crooked shape.

The material of the bumper beam 20 is not particularly limited, and the bumper beam 20 may be formed of other metal materials such as high-tensile steel or a resin material such as fiber-reinforced plastic.

As illustrated in FIG. 2B, the bumper beam 20 is substantially squarish eight-shaped in a cross section perpendicular to the right-left direction, and includes a front wall 23, a rear wall 24, an upper wall 25, a lower wall 26, and an intermediate wall 27. Among these, a front surface of the front wall 23 forms a bumper load input surface 23a that receives impact load from the front side. An upper surface of the upper wall 25 forms an upper absorber support surface 25a that restricts downward movement of the absorber 30. An upper end and a lower end of the front wall 23 protrude from the upper wall 25 and the lower wall 26 to form an upper reinforcing rib 23b and a lower reinforcing rib 23c, respectively.

The cross-sectional shape of the bumper beam 20 is not limited to the substantially squarish eight shape, and may be a substantially square shape or a substantially hat shape.

The upper reinforcing rib 23b includes an upper rib body portion 23b1 extending straight along the bumper body 21, and right and left arc-shaped upper rib curve portions 23b2 extending along the bumper curve portions 22. The upper rib curve portions 23b2 continue from the upper rib body portion 23b1, and are curved to be convex toward the vehicle outer side. In other words, the upper rib curve portions 23b2 are curved (inclined) to be located closer to the vehicle inner side (rear side) in the front-rear direction as they extend toward the vehicle outer side in right-left direction. The upper rib body portion 23b1 is not limited to the straight shape, and may include a crooked shape.

The lower reinforcing rib 23c has a structure similar to that of the upper reinforcing rib 23b.

As illustrated in FIG. 2A, the absorber 30 is provided along the bumper load input surface 23a of the bumper body 21 in the bumper beam 20. For example, the absorber 30 is formed of an elastic resin material such as polypropylene foam. The absorber 30 includes an absorber body 31 that receives impact load, a pair of upper absorber support legs 32 provided at upper right and left ends of the absorber body 31, a lower absorber support leg 33 provided at the lower center of the absorber body 31, and contact portions 34 extending outward in the vehicle width direction from the upper absorber support legs 32 to be in contact with the upper rib curve portions 23b2.

Figure 3A:
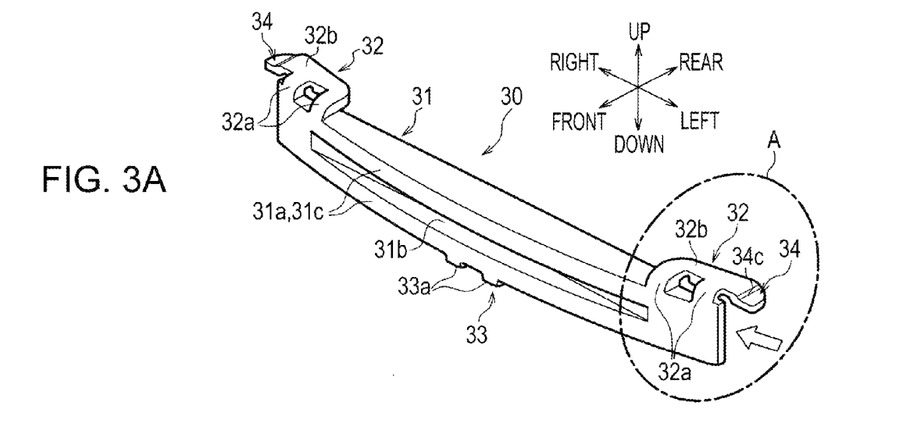
FIG. 3A is a perspective view of an absorber, as viewed from an upper left and front side.

As illustrated in FIG. 3A, the absorber body 31 is shaped like an elongated rectangle that extends in the right-left direction in front view, and has a length substantially equal to or slightly less than the length of the bumper body 21. That is, right and left ends of the absorber body 31 substantially coincide with curve start points of the bumper curve portions 22 and the upper rib curve portions 23b2.

The absorber body 31 includes a pair of bulge portions 31a extending in the right-left direction and spaced from each other in the up-down direction, and a concave groove portion 31b extending in the right-left direction between the bulge portions 31a. That is, the absorber body 31 is substantially M-shaped such as to bulge out at both upper and lower sides and to be recessed at the center, in a cross section perpendicular to the right-left direction (see FIG. 4B). Front surfaces of the bulge portions 31a form absorber load input surfaces 31c that receive impact load. The absorber load input surfaces 31c are arc-shaped to be convex frontward (in a load input direction) at the center in the right-left direction. A rear surface 31d of the absorber body 31 is flat and is in contact with the bumper load input surface 23a of the bumper beam 20.

Figure 3B:
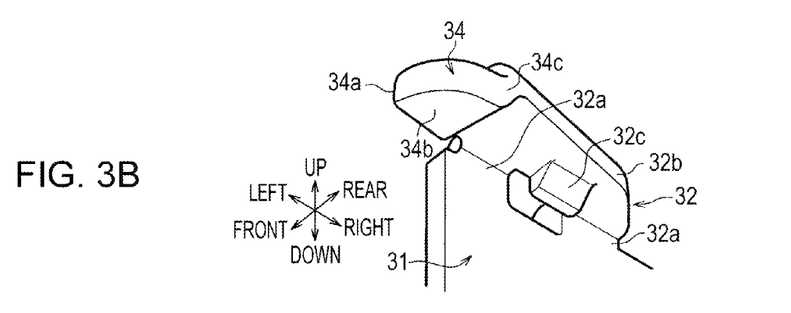
FIG. 3B is a perspective view of a section A in FIG. 3A, as viewed from a left lower side.
Figure 4A:
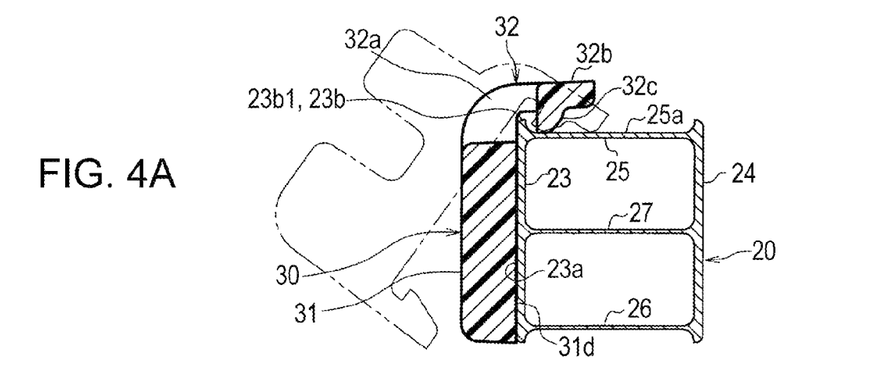
FIG. 4A is a cross-sectional view taken along line IVA-IVA in FIG. 2A.

As illustrated in FIGS. 3A, 3B and 4A, the upper absorber support legs 32 support the absorber 30 relative to the bumper beam 20, and are provided at upper right and left ends of the absorber body 31. Each of the upper absorber support legs 32 includes a pair of leg portions 32a, a base portion 32b, and an engaging claw 32c. The upper absorber support legs 32 are substantially angular U-shaped in plan view.

The pair of leg portions 32a are substantially L-shaped (inverse L-shaped) in side view, and are spaced from each other in the right-left direction. The leg portions 32a protrude from an upper surface of the absorber body 31 higher than the upper reinforcing rib 23b, and extend toward the vehicle inner side across the upper reinforcing rib 23b.

The base portion 32b is shaped like a flat plate that connects vehicle inner side ends of the leg portions 32a in the vehicle width direction. At a vehicle outer side end of the base portion 32b, a below-described contact portion 34 is provided. The width in the front-rear direction of the base portion 32b increases toward the vehicle outer side (contact portion 34 side) in the right-left direction (see FIG. 6A).

The engaging claw 32c projects downward from the center of the base portion 32b and engages with the upper reinforcing rib 23b (more specifically, the upper rib body portion 23b1). The engaging claw 32c is shaped like a claw whose width in the front-rear direction decreases toward the lower side (tapered shape). In a state in which the absorber 30 is attached to the bumper beam 20, there is some clearance between the engaging claw 32c and the upper reinforcing rib 23b.

Figure 3C:
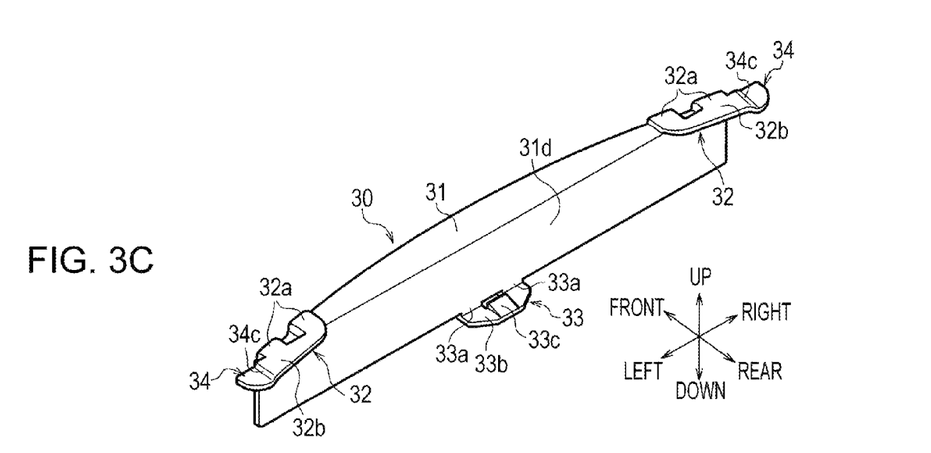
FIG. 3C is a perspective view of the absorber, as viewed from an upper left and rear side.
Figure 4B:
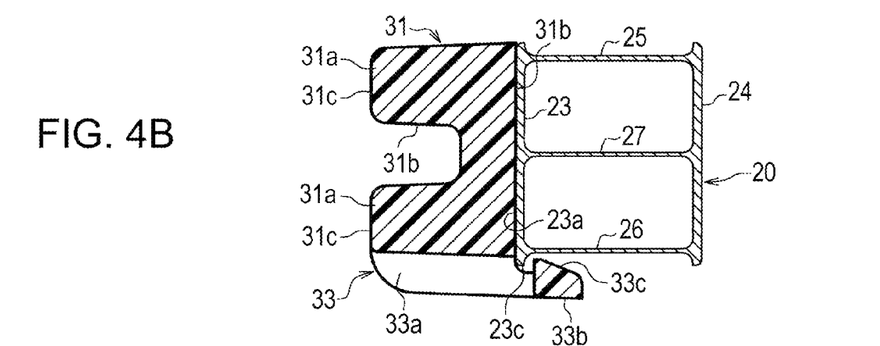
FIG. 4B is a cross-sectional view taken along line IVB-IVB in FIG. 2A.

As illustrated in FIGS. 3A, 3C, and 4B, the lower absorber support leg 33 supports the absorber 30 in cooperation with the upper absorber support legs 32, and is provided at the lower center of the absorber body 31. The lower absorber support leg 33 includes a pair of leg portions 33a, a base portion 33b, and an engaging claw 33c. The lower absorber support leg 33 is substantially angular U-shaped in bottom view.

The pair of leg portions 33a are substantially L-shaped in side view, and are spaced from each other in the right-left direction. The leg portions 33a protrude downward from a lower surface of the absorber body 31 more than the lower reinforcing rib 23c, and extend toward the vehicle inner side across the lower reinforcing rib 23c.

The base portion 33b is shaped like a flat plate that connects vehicle inner side ends of the leg portions 33a in the vehicle width direction.

The engaging claw 33c projects upward from the center of the base portion 33b and engages with the lower reinforcing rib 23c. An upper surface of the engaging claw 33c is inclined such that the height thereof decreases toward the rear side. In a state in which the absorber 30 is attached to the bumper beam 20, there is some clearance between the engaging claw 33c and the lower reinforcing rib 23c.

Since the upper engaging claw 32c and the lower engaging claw 33c are thus engaged with the upper reinforcing rib 23b and the lower reinforcing rib 23c, respectively, from the vehicle inner side (rear side), the absorber 30 is prevented from falling off the bumper beam 20.

As illustrated in FIGS. 3B, 4C, 6A, and 6B, the contact portions 34 position the absorber 30 relative to the bumper beam 20 in the right-left direction. The contact portions 34 continue from the right and left upper absorber support legs 32, and extend from the upper absorber support legs 32 toward the vehicle outer side (outward in the vehicle width direction) in the right-left direction. The contact portions 34 are each shaped like a flat plate, and are located on a slightly lower side of the base portions 32b of the upper absorber support legs 32. The contact portions 34 have inclined portions 34c obliquely continuing from vehicle outer side ends of the base portions 32b of the upper absorber support legs 32 in the right-left direction. The contact portions 34 are provided at positions closer to the vehicle outer side than the right and left ends of the absorber body 31.

Figure 4C:
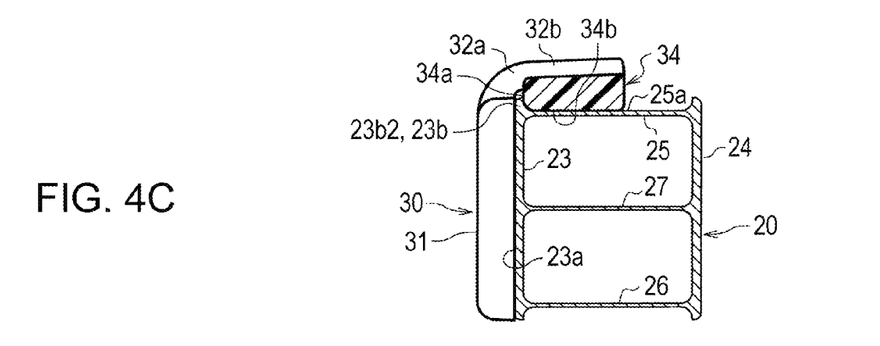
FIG. 4C is a cross-sectional view taken along line IVC-IVC in FIG. 2A.
Figure 6A:
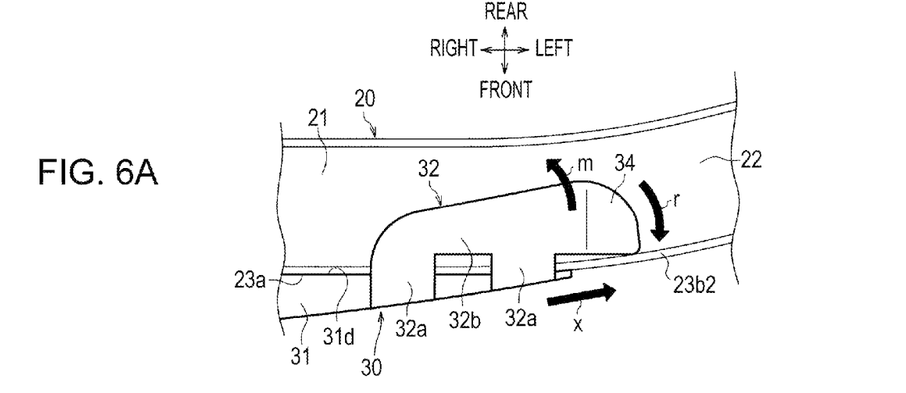
FIG. 6A is an enlarged plan view of a portion near an absorber support leg and a contact portion on the left side.
Figure 6B:
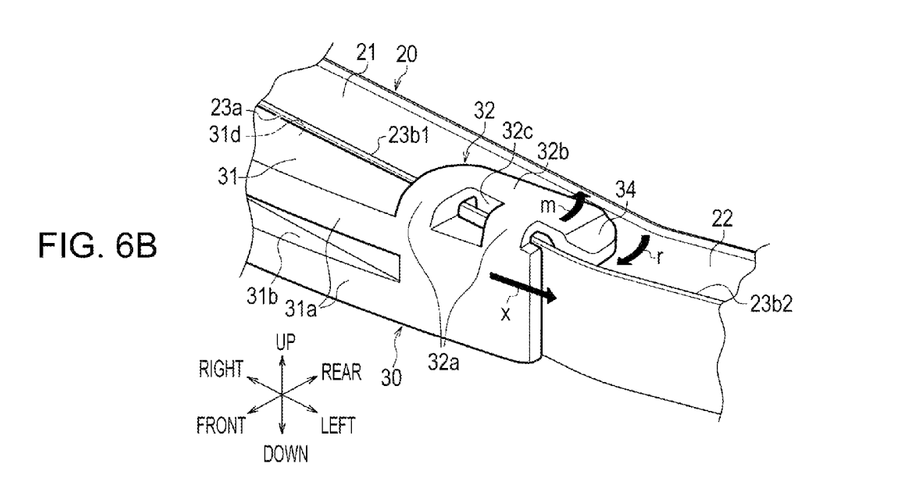
FIG. 6B is a perspective view of the portion, as viewed from an upper front and left side.

Front surfaces 34a of the right and left contact portions 34 are in contact with the right and left upper rib curve portions 23b2 of the upper reinforcing rib 23b from the vehicle inner side. This restricts the absorber 30 in movement in the right-left direction, and the absorber body 31 is drawn to the bumper beam 20.

Bottom surfaces 34b of the right and left contact portions 34 are in contact with the upper absorber support surface 25a of the upper wall 25 from above. This restricts downward movement of the absorber 30.

As illustrated in FIG. 4C, corners (external corners) defined by the front surfaces 34a and the bottom surfaces 34b of the contact portions 34 are shaped like arcs that closely fit corners (internal corners) defined by the upper rib curve portions 23b2 and the upper wall 25.

Preferably, the distance between the vehicle outer side ends of the contact portions 34 is slightly longer than the distance between the right and left upper rib curve portions 23b2 in contact with the contact portions 34. Thus, when the absorber 30 is attached to the bumper beam 20, elastic reaction force acts on the upper absorber support legs 32, so that the absorber 30 can be drawn to the bumper beam 20.

Figure 5A:
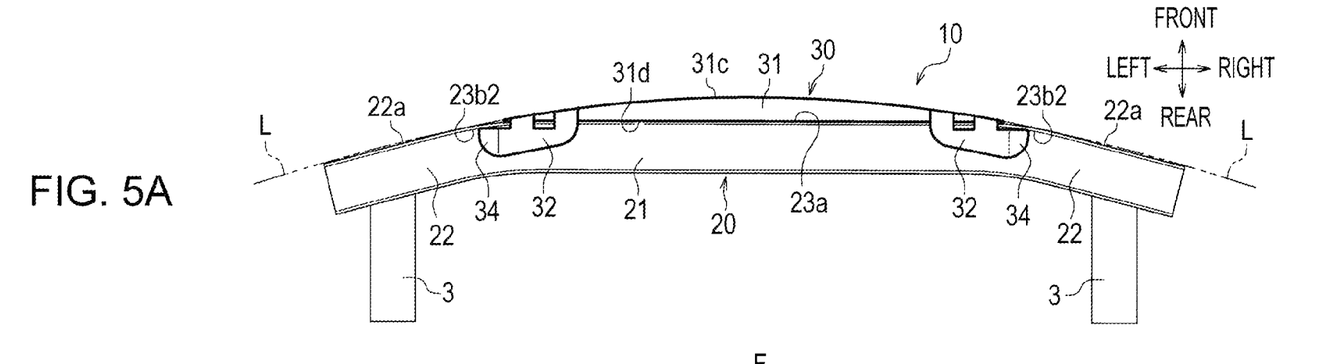
FIGS. 5A and 5B are plan views of the vehicle bumper structure, respectively, illustrating a state before load input and a state after load input.

As illustrated in FIG. 5A, front surfaces of the bumper curve portions 22 of the bumper beam 20 form bumper load input surfaces 22a. The bumper load input surfaces 22a are located on extension lines L obtained by extending the arc shape of the absorber-load input surface 31c of the absorber body 31 to the right and the left. Thus, the bumper load input surfaces 22a smoothly continue from the absorber-load input surface 31c in an arc form.

The vehicle bumper structure 10 of the embodiment basically has the above-described structure. Next, a procedure for mounting the vehicle bumper structure 10 will be described with reference to FIGS. 4A, 4B, and 5A.

First, as shown by an imaginary line (two-dot chain line) in FIG. 4A, the absorber 30 is tilted, and the upper engaging claws 32c of the absorber 30 are placed on a vehicle inner side of the upper rib body portion 23b1 of the bumper beam 20 and are then engaged with the upper rib body portion 23b1.

At this time, as illustrated in FIG. 5A, the contact portions 34 at the right and left ends of the absorber 30 are brought into contact with the upper rib curve portions 23b2 of the bumper beam 20. This positions the absorber 30 in the right-left direction relative to the bumper beam 20.

Next, the absorber 30 is turned about the upper engaging claws 32c until the lower engaging claw 33c of the absorber 30 comes into contact with the lower reinforcing rib 23c of the bumper beam 20.

Then, when the absorber 30 is further turned, as illustrated in FIG. 4B, the lower engaging claw 33c elastically deforms and passes over the lower reinforcing rib 23c. At this time, since the upper surface of the lower engaging claw 33c is inclined such that the height thereof decreases toward the rear side, the lower engaging claw 33c can easily pass over the lower reinforcing rib 23c. Thus, the lower engaging claw 33c is located on the vehicle inner side (rear side) of the lower reinforcing rib 23c, and engages with the lower reinforcing rib 23c.

Through the above steps, attachment of the absorber 30 to the bumper beam 20 is completed.

Next, the operation of the vehicle bumper structure 10 according to the embodiment will be described with reference to FIGS. 5B and 6A.

Figure 5B:
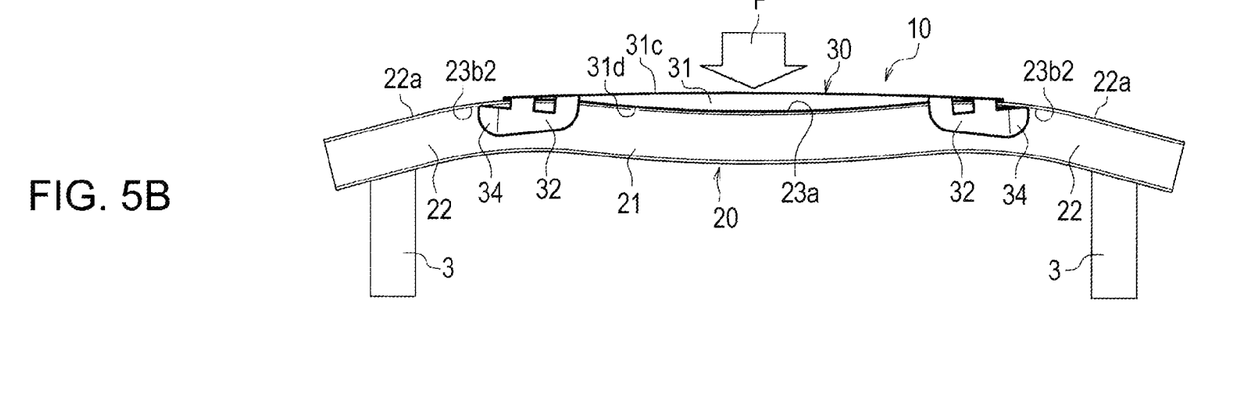

As illustrated in FIG. 5B, when an impact load F acts on the vehicle bumper structure 10 from the vehicle front side, first, the absorber body 31 of substantially M-shaped cross section is crushed and deformed to absorb the impact load F. Then, the impact load F is transmitted in a dispersed manner to the bumper load input surface 23a of the bumper beam 20 via the rear surface 31d of the absorber body 31, and the bumper beam 20 is uniformly (entirely) deformed. This inhibits only a part of the bumper beam 20 from being highly deformed, and enhances the impact absorbing performance of the bumper beam 20.

For example, when the absorber 30 is going to move leftward (see arrow x) because of vibration caused in mounting operation or in low speed operation of the engine, as illustrated in FIG. 6A, a bending moment for deformation toward the vehicle rear side (see arrow m) acts on the contact portions 34 that contact with the upper rib curve portions 23b2 from the vehicle inner side.

At this time, the rear surface 31d of the absorber body 31 is pressed against the bumper load input surface 23a of the bumper beam 20, and an elastic reaction force (see arrow r) is applied to the contact portions 34 by the support force of the upper absorber support legs 32. This restricts the absorber 30 in movement in the right-left direction, and positions the absorber 30 in the right-left direction.

As described above, according to the vehicle bumper structure 10 of the embodiment, since the bumper beam 20 is provided with the absorber 30, the absorber 30 absorbs the impact load F, and avoids concentration of the impact load F at the bumper beam 20. Thus, the impact load F is dispersed and absorbed while uniformly (entirely) deforming the bumper beam 20.

More specifically, since the absorber load input surface 31c of the absorber body 31 that receives the impact load is shaped, in plan view, like an arc whose center in the vehicle width direction bulges frontward, it properly absorbs the impact load F, and avoids concentration of the impact load F at the bumper beam 20. As a result, the impact load F is dispersed and absorbed while uniformly (entirely) deforming the bumper beam 20.

Further, since the right and left contact portions 34 extend outward in the vehicle width direction from the upper absorber support legs 32, and contact with the upper rib curve portions 23b2 of the upper reinforcing rib 23b from the vehicle inner side, the absorber 30 is restricted in movement in the right-left direction owing to vibration caused in mounting of the absorber 30 or low speed operation of the engine during vehicle running. For this reason, there is no need to form engaging pins and insertion holes, unlike the structure of the related art. This achieves a simple structure.

Since the right and left contact portions 34 contact with the right and left upper rib curve portions 23b2 from the vehicle inner side, the absorber 30 is drawn to the bumper beam 20. Hence, the absorber 30 is restricted in movement in the front-rear direction owing to vibration caused in low speed operation of the engine during vehicle running. This prevents the bumper beam 20 from causing noise and vibration by swinging in the front-rear direction and contacting with the bumper beam 20.

Since the contact portions 34 contact not only with the upper rib curve portions 23b2 but also with the upper absorber support surface 25a, downward movement of the absorber 30 is restricted. Hence, the absorber 30 can be easily positioned in the up-down direction during mounting, and can be prevented from hanging under its own weight.

The engaging claws 32c of the upper absorber support legs 32 provided on the upper side of the absorber 30 are engaged with the upper reinforcing rib 23b projecting from the upper absorber support surface 25a on the upper side of the bumper beam 20, and the engaging claw 33c of the lower absorber support leg 33 on the lower side of the absorber 30 is engaged with the lower reinforcing rib 23c on the lower side of the bumper beam 20. This allows the absorber 30 to be easily fixed to the bumper beam 20 without using any separate member during mounting.

By cooperation of the upper engaging claws 32c and the lower engaging claw 33c with the right and left contact portions 34, the absorber 30 can be positioned in the front-rear, right-left, and up-down directions, and positioning is facilitated.

Since both ends in the vehicle width direction of the base portions 32b having the engaging claws 32c at the center are supported by the leg portions 32a, support rigidity of the engaging claws 32c is enhanced. For this reason, the engaging claws 32c can be firmly supported against the load acting thereon owing to vibration caused in mounting operation and in low speed operation of the engine during vehicle running.

Since the bumper beam 20 has the bumper curve portions 22 at the right and left sides and the absorber 30 is mounted on the bumper load input surface 23a of the bumper body 21, the contact portions 34 of the absorber 30 contact with the upper rib curve portions 23b2 at the upper ends of the bumper curve portions 22, so that the absorber 30 is restricted in movement in the right-left direction. For this reason, unlike the structure of the related art, there is no need to perform boss forming by extending support ends on the right and left sides of the absorber 30 for positioning, and the length of the absorber 30 itself can be shortened while maintaining the impact absorbing performance. This achieves weight and cost reduction.

Since the bumper load input surfaces 22a of the bumper curve portions 22 are located on the extension lines L obtained by extending the arc shape of the absorber load input surface 31c to the right and the left, the absorber load input surface 31c and the bumper load input surfaces 22a are flush with each other. This increases the degree of flexibility in design without any influence on the shape of the bumper face 7.

Since the absorber body 31 is substantially M-shaped in cross section, it can properly absorb the impact load F from the vehicle front side, and concentration of the impact load F at the bumper beam 20 is avoided. Hence, the impact load F is dispersed, and the bumper beam 20 can be deformed uniformly (entirely).

While the embodiment has been described in detail above with reference to the drawings, various modifications can be appropriately made without departing from the scope of the present application.

For example, while the vehicle bumper structure 10 is applied to the front bumper of the car C in the embodiment, it may be alternatively applied to a rear bumper of the car C.

While the upper absorber support legs 32 and the contact portions 34 are provided on the upper right and left sides of the absorber body 31 and the lower absorber support leg 33 is provided at the lower center of the absorber body 31 in the embodiment, alternatively, for example, lower absorber support legs 33 and contact portions 34 may be provided on the lower right and left sides of the absorber body 31 and an upper absorber support leg 32 may be provided at the upper center of the absorber body 31. Further alternatively, absorber support legs and contact portions may be provided on the right and left ends of the upper and lower sides of the absorber body 31.

While the base portions 32b and 33b of the upper and lower absorber support legs 32 and 33 are supported by the leg portions 32a and 33a, respectively, from both sides in the embodiment, for example, the base portions 32b and 33b may each be supported by one wide leg portion.

While the absorber body 31 is substantially M-shaped in cross section in the embodiment, for example, the absorber body 31 may be formed by one bulge portion 31a without forming the concave groove portion 31b.

We claim:

1. A vehicle bumper structure comprising:
    a bumper beam disposed in a vehicle width direction between ends of right and left frame members extending in a vehicle front-rear direction; and
    an absorber provided along a bumper load input surface of the bumper beam, the bumper load input surface receiving an impact load,
    wherein the bumper beam includes an absorber support surface extending toward a vehicle inner side from at least one of upper and lower ends of the bumper load input surface, and a reinforcing rib projecting from the absorber support surface,
    wherein the reinforcing rib includes a rib body, and a pair of right and left rib bend portions extending from right and left ends of the rib body so as to bend toward the vehicle inner side, and
    wherein the absorber includes an absorber body that receives the impact load, a pair of right and left absorber support legs extending from the absorber body over the reinforcing rib, and a pair of right and left contact portions extending outward in the vehicle width direction from the absorber support legs so as to contact to the right and left rib bend portions from the vehicle inner side such that the position of the absorber in the vehicle width direction is fixed by the right contact portion and the left contact portion contacting the right rib bend portion and the left rib bend portion, respectively.

2. The vehicle bumper structure according to claim 1, wherein the absorber support surface extends toward the vehicle inner side from at least the upper end of the bumper load input surface, and the contact portions further contact to the absorber support surface from an upper side.

3. The vehicle bumper structure according to claim 1,
    wherein the absorber support surface includes an upper absorber support surface extending toward the vehicle inner side from the upper end of the bumper load input surface, and a lower absorber support surface extending toward the vehicle inner side from the lower end of the bumper load input surface,
    wherein the absorber support legs include an upper absorber support leg provided on an upper side of the absorber body, and a lower absorber support leg provided on a lower side of the absorber body,
    wherein the absorber support legs each include a plurality of leg portions extending from the absorber body across the reinforcing rib toward the vehicle inner side, and a base portion that connects the leg portions in the vehicle width direction,
    wherein the base portion includes an engaging claw provided near the center in the vehicle width direction, and
    wherein the engaging claw of the upper absorber support leg extends toward the upper absorber support surface and engages with the reinforcing rib of the upper absorber support surface, and the engaging claw of the lower absorber support leg extends toward the lower absorber support surface and engages with the reinforcing rib of the lower absorber support surface.

4. The vehicle bumper structure according to claim 1, wherein the bumper beam includes a bumper body including the bumper load input surface, and bumper bend portions extending from right and left ends of the bumper body so as to bend toward the vehicle inner side, and the absorber is located on a part of the bumper load input surface in the bumper body.

5. The vehicle bumper structure according to claim 4, wherein the absorber body includes an absorber load input surface to receive the impact load, the absorber load input surface is formed, in plan view, in an arc the center thereof in the vehicle width direction protruding from the bumper load input surface of the bumper beam in a load input direction, and the bumper bend portions each include a second bumper load input surface provided on extension lines obtained by extending the arc shape of the absorber load input surface in the vehicle width direction.

6. The vehicle bumper structure according to claim 1, wherein the absorber body is substantially M-shaped in a cross section perpendicular to the vehicle width direction.

7. The vehicle bumper structure according to claim 1, wherein the rib body extends substantially straight in the vehicle width direction.

* * * * *